(12) United States Patent
Tucker et al.

(10) Patent No.: US 7,329,695 B2
(45) Date of Patent: Feb. 12, 2008

(54) INK FORMULATIONS AND USES THEREOF

(75) Inventors: Robert Carey Tucker, Arlington Heights, IL (US); Sandra Corti, Mt. Prospect, IL (US)

(73) Assignee: Novartis AG, Basel (CH)

( * ) Notice: Subject to any disclaimer, the term of this patent is extended or adjusted under 35 U.S.C. 154(b) by 242 days.

(21) Appl. No.: 10/654,114

(22) Filed: Sep. 3, 2003

(65) Prior Publication Data
US 2004/0044099 A1    Mar. 4, 2004

Related U.S. Application Data

(60) Provisional application No. 60/408,056, filed on Sep. 3, 2002.

(51) Int. Cl.
*C09D 11/00*     (2006.01)
(52) U.S. Cl. .................. 523/160; 523/161; 524/557; 106/31.27; 106/31.6
(58) Field of Classification Search ............... 523/160, 523/161
See application file for complete search history.

(56) References Cited

U.S. PATENT DOCUMENTS

| 4,543,102 | A | * | 9/1985 | Defago et al. ............. 8/471 |
| 4,881,084 | A | | 11/1989 | Kan et al. |
| 5,116,112 | A | * | 5/1992 | Rawlings ................. 351/162 |
| 6,149,842 | A | | 11/2000 | Lally et al. |
| 6,315,410 | B1 | * | 11/2001 | Doshi .................... 351/162 |
| 2001/0050753 | A1 | * | 12/2001 | Tucker .................... 351/177 |
| 2003/0054109 | A1 | * | 3/2003 | Quinn et al. ............ 427/385.5 |
| 2003/0085934 | A1 | * | 5/2003 | Tucker et al. ............... 347/1 |

FOREIGN PATENT DOCUMENTS

| EP | 0 096 806 | A1 | | 6/1983 |
| EP | 0 096 806 | B1 | | 9/1986 |
| EP | 0 384 632 | A1 | | 2/1990 |
| EP | 384632 | A | * | 8/1990 |
| WO | WO 96/24078 | A1 | * | 8/1996 |
| WO | WO 9624076 | A1 | * | 8/1996 |
| WO | WO 97/41180 | | | 11/1997 |
| WO | WO 03/040242 | A2 | | 11/2002 |

OTHER PUBLICATIONS

European Search Report (2003).
International Search Report.

* cited by examiner

*Primary Examiner*—Bernard Lipman
(74) *Attorney, Agent, or Firm*—Sheng-Hsin Hu; Jian Zhou; Robert J. Gorman

(57) ABSTRACT

The present invention provides a chemical ink for pad printing a medical device comprising water; a colorant; and a crosslinkable, water-soluble poly(vinyl alcohol). The ink has a viscosity of greater than 50 centipoise, and good adhesion to the medical device. Method for printing contact lenses with such ink are also disclosed.

23 Claims, No Drawings

INK FORMULATIONS AND USES THEREOF

This application claims the benefit under 35 USC § 119 (e) of U.S. provisional application No. 60/408,056 filed Sep. 3, 2002, incorporated by reference in it's entirety.

The present invention relates to ink that can be applied by pad printing systems to the molds that will be used to make contact lenses. The resultant product will be a contact lens to which colored ink has been applied. Furthermore, the present invention is related to a method for making a colored contact lens.

BACKGROUND

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, and the like, which are of benefits to wearers, eye-care practitioners and manufacturers.

Presently, methods of printing inks onto contact lens molds involve cliche ink transfer printing. A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts the contact lens mold.

A number of inks are known in the art for cliché ink transfer printing of color images on a contact lens. Examples of such inks include those disclosed in U.S. Pat. Nos. 4,668,240, 4,857,072, 5,272,010, and 5,414,477. However, such inks known in the art are either incompatible with or incapable of producing a high quality color image on a nelfilcon (acrylate-modified PVA) contact lens when using a pad-printing system.

U.S. Pat. No. 6,162,844 to Lally, et al. discloses a introducing at least one polymeric dye and polyvinyl alcohol into a mold, and crosslinking or polymerizing to form a lens. Likewise, U.S. Pat. No. 6,149,842 to Lally, et al. teaches the making of a tinted lens by mixing a metal phthalocyanine dye or pigment with polyvinyl alcohol, which is then dispensed into a lens mold and crosslinked or polymerized to entrap the dye or pigment within the polymeric network of the lens. However, both result in a lens with dye or pigment dispersed throughout the lens, not an image printed on the surface or within the lens.

Copending U.S. Application Ser. No. 60/348,257, filed Nov. 7, 2001, by the present inventors discloses a colored ink to be printed upon a medical device by ink-jetting methods. However, consistent with the teachings of that application, every ink disclosed therein has a viscosity significantly lower than 50 centipoise. Such inks are inherently unsuitable for pad-printing methods.

Therefore, there exists a need for methods and inks suitable for producing a high-quality color image on a nelfilcon contact lens using a pad-printing system. There is also a need for methods for making such inks.

SUMMARY OF THE INVENTION

The inks of the present invention are suitable for producing a high-quality color image on a nelfilcon contact lens using a pad-printing system.

In one aspect of the invention, ink comprises water, a poly(vinyl alcohol) or a derivative of poly(vinyl alcohol), and colorant. The ink of the invention has one or more of the following characteristics: a viscosity greater than 50 centipoise (cps); prolonged stability (i.e., stable for at least 4 hours, preferably at least 8 hours, more preferably at least 24 hours, even more preferably at least 7 days, most preferably at least three weeks); an appropriate color level (visible by eye); good adhesion to medical devices; and good transfer from a mold to a medical device made in the mold.

In another aspect of the invention, a method for making a colored contact lens is provided. The method comprises the steps:

(a) coating at least a portion of at least one lens-forming surface of a lens mold with an ink comprising water; a colorant; and a crosslinkable, water-soluble poly(vinyl alcohol), wherein the ink has a viscosity of greater than 50 centipoise;

(b) adding a lens forming composition to the lens mold while maintaining the color coat in position; and (c) curing the lens-forming composition to form a coated lens;

wherein said contact lens will pass the finger-rubbing test.

The present invention provides the foregoing and other features, and the advantages of the invention will become further apparent from the following detailed description of the presently preferred embodiments, read in conjunction with the accompanying figures. The detailed description is merely illustrative of the invention and does not limit the scope of the invention, which is defined by the appended claims and equivalents thereof.

DETAILED DESCRIPTION OF THE PREFERRED EMBODIMENT

The present invention provides an ink comprising: water; a colorant; and a water-soluble poly(vinyl alcohol) having crosslinking groups. Such inks are characterized by having a viscosity of greater than 50 centipoise, and good adhesion to a medical device. Thus, the inks of the present invention are useful for printing a color image on a medical device, preferably for producing colored ophthalmic lenses, more preferably for producing colored contact lenses.

Unless defined otherwise, all technical and scientific terms used herein have the same meaning as commonly understood by one of ordinary skill in the art to which this invention belongs. Generally, the nomenclature used herein and the laboratory procedures well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings:

"Colorant" includes both dyes and opaque coloring agents, either alone or in combination.

"Dye" means a substance that is soluble in a solvent and is used to impart color.

Dyes are typically translucent and absorb, but do not scatter light. Dyes can cover both optical (covering the pupil) and non-optical regions (not covering the pupil) of contact lens. Nearly any dye can be used in the present invention, as long as it is compatible with the processes described herein, including fluorescent dyes, phosphorescent dyes, pearlescent dyes, and conventional dyes.

"Opaque coloring agent" includes both pigments and particles.

"Pigment" in the context of opaque coloring agents refers to a variety of organic or inorganic insoluble pigments known in the art, such as titanium dioxide, red iron oxide, yellow iron oxide, Pigment Blue 15 (phthalocyanine blue (CI 74160)), Pigment Green 7 (phthalocyanine green (CI 74260)), Pigment Blue 36 (cobalt blue (CI 77343)), or chromium sesquioxide. Some pigments may exhibit fluorescence or phosphorescence. While specific examples are given throughout this specification, the skilled artisan will recognize that any of a variety of pigments may be used.

"Particle" in the context of opaque coloring agents refers to a variety of colored particles, as they are known in the art, such as India ink. This term also includes structures that while not colored, give the appearance of color by, for example, diffraction or scattering (for example) of light by the particle. Some particles may exhibit fluorescence or phosphorescence.

"Ophthalmically compatible," as used herein, refers to a material or surface of a material which may be in intimate contact with the ocular environment for an extended period of time without significantly damaging the ocular environment and without significant user discomfort. Thus, an ophthalmically compatible contact lens will not produce significant corneal swelling, will adequately move on the eye with blinking to promote adequate tear exchange, will not have substantial amounts of lipid adsorption, and will not cause substantial wearer discomfort during the prescribed period of wear. The lenses of the present invention are preferably ophthalmically compatible.

"Ocular environment," as used herein, refers to ocular fluids (e. g., tear fluid) and ocular tissue (e.g., the cornea) which may come into intimate contact with a contact lens used for vision correction, drug delivery, wound healing, eye color modification, or other ophthalmic applications.

"Pattern" refers to a predetermined image to be printed onto the contact lenses. The pattern may either be fanciful or realistic in appearance. The pattern is preferably designed in accordance with U.S. Pat. Nos. 5,160,463 to Evans et al. and 5,414,477 to Jahnke).

A "medical device" refers to a device having surfaces that contact tissue, blood, or other bodily fluids of patients in the course of their operation. Exemplary medical devices include: (1) extracorporeal devices for use in surgery such as blood oxygenators, blood pumps, blood sensors, tubing used to carry blood and the like which contact blood which is then returned to the patient; (2) prostheses implanted in a human or animal body such as vascular grafts, stents, pacemaker leads, heart valves, and the like that are implanted in blood vessels or in the heart; (3) devices for temporary intravascular use such as catheters, guide wires, and the like which are placed into blood vessels or the heart for purposes of monitoring or repair; and (4) ophthalmic lenses.

"An ophthalmic lens," as used herein, refers to a contact lens (hard or soft), or an intraocular lens. In certain aspects of the present invention, a lens need not act as an optical lens, such as a contact lens that is used for vanity purposes as opposed to purposes relating to the correction, improvement, or alteration of a user's eyesight.

A "colored ophthalmic lens" refers to an ophthalmic lens having a color image thereon. A "colored contact lens" refers to a contact lens (hard or soft) having a color image printed thereon. A color image can be a cosmetic pattern, for example, iris-like patterns, WILD EYE™ patterns, made-to-order (MTO) patterns, and the like; an inversion mark that allows a user to handle and insert easily a contact lens, for example, a FRESHLOOK™ contact lens (CIBA Vision); or contact lenses stock keeping units (SKUs), for example, either in forms of numbers or as bar codes. A color image can be a single color image or a multi-color image. A color image is preferably a digital image, but it can also be an analog image.

The ink composition of the present invention comprises a crosslinkable, water-soluble poly(vinyl alcohol) (PVA). More preferably, the PVA is a crosslinkable polymer based on a polyhydroxyl compound which is a derivative of a poly(vinyl alcohol) having a molecular weight of at least about 2000 which comprises from about 0.5 to about 80%, based on the number of hydroxyl groups in the poly(vinyl alcohol), of units of the formula I, I and II, I and III, or I and II and III.

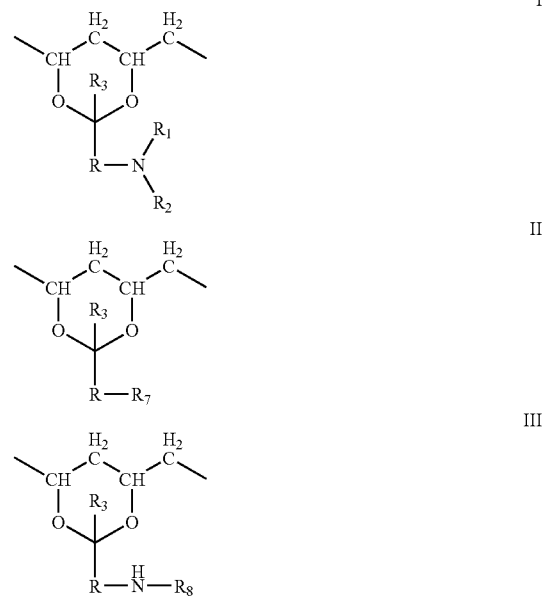

In formula I, II and III, $R_3$ is hydrogen, a $C_1$-$C_6$ alkyl group or a cycloalkyl group.

In formula I and II, and III, R is alkylene having up to 12 carbon atoms, preferably up to 8 carbon atoms, and can be linear or branched. Suitable examples include octylene, hexylene, pentylene, butylene, propylene, ethylene, methylene, 2-propylene, 2-butylene and 3-pentylene. Lower alkylene R preferably has up to 6, particularly preferably up to 4 carbon atoms. Methylene and butylene are particularly preferred.

In the formula I, $R_1$ is hydrogen or lower alkyl having up to seven, in particular up to four, carbon atoms. Most preferably, $R_1$ is hydrogen.

In the formula I, $R_2$ is an olefinically unsaturated, electron-withdrawing, crosslinkable radical, preferably having up to 25 carbon atoms. In one embodiment, $R_2$ is an olefinically unsaturated acyl radical of the formula $R_4$—CO—, in which $R_4$ is an olefinically unsaturated, crosslinkable radical having 2 to 24 carbon atoms, preferably having 2 to 8 carbon atoms, particularly preferably having 2 to 4 carbon atoms.

The olefinically unsaturated, crosslinkable radical $R_4$ having 2 to 24 carbon atoms is preferably alkenyl having 2 to 24 carbon atom, in particular alkenyl having 2 to 8 carbon atoms, particularly preferably alkenyl having 2 to 4 carbon atoms, for example ethenyl, 2-propenyl, 3-propenyl, 2-butenyl, hexenyl, octenyl or dodecenyl. Ethenyl and 2-propenyl are preferred, so that the —CO—R$_4$ group is the acyl radical of acrylic acid or methacrylic acid.

In another embodiment, the radical R$_2$ is a radical of the formula IV, preferably of the formula V

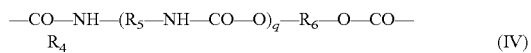 (IV)

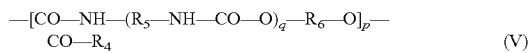 (V)

in which p and q, independently of one another, are zero or one, and R$_5$ and R$_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which R$_4$ is as defined above.

Lower alkylene R$_5$ or R$_6$ preferably has 2 to 6 carbon atoms and is, in particular, linear. Suitable examples include propylene, butylene, hexylene, dimethylethylene and, particularly preferably, ethylene.

Arylene R$_5$ or R$_6$ is preferably phenylene, which is unsubstituted or substituted by lower alkyl or lower alkoxy, in particular 1,3-phenylene or 1,4-phenylene or methyl-1,4-phenylene.

A saturated bivalent cycloaliphatic group R$_5$ or R$_6$ is preferably cyclohexylene or cyclohexylene(lower alkylene), for example cyclohexylenemethylene, which is unsubstituted or substituted by one or more methyl groups, for example trimethylcyclohexylenemethylene, for example the bivalent isophorone radical.

The arylene unit of alkylenearylene or arylenealkylene R$_5$ or R$_6$ is preferably phenylene, unsubstituted or substituted by lower alkyl or lower alkoxy, and the alkylene unit thereof is preferably lower alkylene, such as methylene or ethylene, in particular methylene. Radicals R$_5$ or R$_6$ of this type are therefore preferably phenylenemethylene or methylenephenylene.

Arylenealkylenearylene R$_5$ or R$_6$ is preferably phenylene(lower alkylene)phenylene having up to 4 carbon atoms in the alkylene unit, for example phenyleneethylene-phenylene.

The radicals R$_5$ and R$_6$ are preferably, independently of one another, lower alkylene having 2 to 6 carbon atoms, phenylene, unsubstituted or substituted by lower alkyl, cyclohexylene or cyclohexylene(lower alkylene), unsubstituted or substituted by lower alkyl, phenylene(lower alkylene), (lower alkylene)phenylene or phenylene(lower alkylene)phenylene.

In the formula II, R$_7$ is a primary, secondary or tertiary amino group or a quaternary amino group of the formula N$^+$(R')$_3$X$^-$, in which each R', independently of the others, is hydrogen or a C$_1$-C$_4$ alkyl radical and X is a counterion, for example HSO$_4^-$, $^{F-}$, Cl$^-$, Br$^-$, I$^-$, CH$_3^-$, COO$^-$, OH$^-$, BF$^-$, or H$_2$PO$_4^-$.

The radicals R$_7$ are, in particular, amino, mono- or di(lower alkyl)amino, mono- or diphenylamino, (lower alkyl)phenylamino or tertiary amino incorporated into a heterocyclic ring, for example —NH$_2$, —NH—CH$_3$, —N(CH$_3$)$_2$, —NH(C$_2$H$_5$), —N(C$_2$H$_5$)$_2$, —NH(phenyl), —N(C$_2$H$_5$)phenyl or

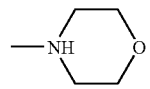

In the formula III, R$_8$ is the radical of a monobasic, dibasic or tribasic, saturated or unsaturated, aliphatic or aromatic organic acid or sulfonic acid. Preferred radicals R$_8$ are derived, for example, from chloroacetic acid, succinic acid, glutaric acid, adipic acid, pimelic acid, maleic acid, fumaric acid, itaconic acid, citraconic acid, acrylic acid, methacrylic acid, phthalic acid and trimellitic acid.

For the purposes of this invention, the term "lower" in connection with radicals and compounds denotes, unless defined otherwise, radicals or compounds having up to 7 carbon atoms, preferably having up to 4 carbon atoms.

Lower alkyl has, in particular, up to 7 carbon atoms, preferably up to 4 carbon atoms, and is, for example, methyl, ethyl, propyl, butyl, or tert-butyl.

Lower alkoxy has, in particular, up to 7 carbon atoms, preferably up to 4 carbon atoms, and is, for example, methoxy, ethoxy, propoxy, butoxy or tert-butoxy.

The bivalent group —R$_5$—NH—CO—O— is present if q is one and absent if q is zero. Polymers containing a crosslinkable group in which q is zero are preferred.

The bivalent group —CO—NH—(R$_5$—NH—CO—O) q—R$_6$—O— is present if p is one and absent if p is zero. Polymers containing a crosslinkable group in which p is zero are preferred.

In the polymers comprising units containing a crosslinkable group in which p is one, the index q is preferably zero. Particular preference is given to polymers comprising a crosslinkable group in which p is one, the index q is zero, and R$_5$ is lower alkylene.

In the formula N$^+$(R')$_3$X$^-$, R' is preferably hydrogen or C$_1$-C$_3$ alkyl, and X is halide, acetate or phosphite, for example —N$^+$(C$_2$H$_5$)$_3$CH$_3$COO$^-$, —N$^+$(C$_2$H$_5$)$_3$Cl$^-$,. and —N$^+$(C$_2$H$_5$)$_3$H$_2$PO$_4^-$.

Such crosslinkable polymers comprising units of the formula I, I and II, I and III, or I and II and III can be prepared in a manner known per se. For example, U.S. Pat. Nos. 5,583,163 and 6,303,687 disclose and teach how to prepare crosslinkable polymers comprising units of the formula I, I and II, I and III, or I and II and III. The preferred PVA is nelfilcon.

Advantage of using poly(vinyl alcohol)s or above-described derivatives of poly(vinyl alcohol)s as binder polymers is that these binder polymers can also function like a dispersing agent to suspend many pigments over a wide range of viscosities. A "dispersing agent" or "dispersant" refers to a surface-active substance added to a suspension to improve the separation of particles and to prevent settling or clumping. Therefore, there is not a need in the present invention for a separate dispersing agent. While one may optionally be present, it is preferred that the ink be substantially free of a dispersing agent.

The ink of the present invention comprises water as a solvent in an amount sufficient to solubilize the poly(vinyl alcohol) and achieve a viscosity above 50 centipoise.

The inks may also (but preferably do not) comprise a solvent in addition to water. The solvent can be any appropriate organic or inorganic solvent. Any known suitable solvents can be used, so long as they do not precipitate the poly(vinyl alcohol) or adversely affect the stability of the colorant. Exemplary solvents include, without limitation, acetone, alcohols (e.g., methanol, ethanol, propanol, isopropanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

The additional solvent may also be a mixture of several organic solvents or a mixture of water and one or more water soluble or water miscible organic components, such as ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof.

Nearly any pigment or dye can be used in the present invention, so long as it is compatible with poly (vinyl alcohol).

However, dyes may not provide a highly opaque print that pigment can provide. Accordingly, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

The choice of pigments is quite flexible, since they need not necessarily contain functional groups. The pigments may be any coloring substance or combination thereof that provides a desired color. Preferred pigments include (C.I. is the color index no.) for a blue color, phthalocyanine blue (pigment blue 15, C.I. 74160), cobalt blue (pigment blue 36, C.I. 77343); for a green color, phthalocyanine green (Pigment green 7, C.I. 74260) and chromium sesquioxide; for yellow, red, brown and black colors, various iron oxides; for violet, carbazole violet. Of course, since any color can be obtained by merely mixing two or more primary colors together, blends of such primary colors are used to achieve the desired shade. Titanium dioxide can be added to the ink to increase the opacity of the pattern.

In any event, if the medical device is an ophthalmic lens it is important that the resulting lens be ophthalmically compatible. Accordingly, while any suitable colorant may be employed, it is presently preferred that the colorant be a pigment that is heat resistant, non-toxic and insoluble in aqueous solutions. While not critical to the invention, the particle size of the pigments used in the present invention generally varies from about 0.02 microns to about 10 microns, more preferably 3 microns or smaller. Most preferably, a pigment is less than one micron. As is well known, larger pigments can be ground into smaller particles. Preferred methods of reducing a pigment's particle size include high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

The viscosity of the binder polymer as it applied to the lens material is important for maintaining print quality. The viscosity of an ink solution can be as high as about 5,000 centipoise (cps), but is preferably between about 50 to about 1000 cps. The viscosity is preferably above 100 cps; more preferably above 200 cps. Most preferably, the viscosity of the ink is between 250 and 350 cps. If the viscosity is expressed in terms of natural log viscosity, the most preferred range is between 5.5 and 5.9 log (cps).

The proper concentration of nelfilcon, the colorant, and water to achieve the preferred ink viscosity can be determined, for example, by a design of experiment by modeling the design as a quadratic D-optimal mixture design. This can be done, for example, with a commercial software program, such as Design Expert (v. 6.0.0, from Stat-Ease of Minneapolis, Minn.). Using the inks prepared in Example 2, one equation for such a formulation was obtained by the inventors in this manner (predicted $r^2$=0.9970): ln(viscosity) =0.077186*nelfilcon+0.94358*PCN+5.81792E-003*water−7.51736E-003*nelfilcon*PCN−8.15566E-003*PCN 8 water, where ln(viscosity) is between 5.9 and 5.5.

In one embodiment of the invention, an ink formulation comprises water in an amount of from about 1% and 59% by weight, preferably from about 21% and 52% by weight, more preferably from about 28% and 45% by weight; a crosslinkable, water-soluble poly (vinyl alcohol) in an amount of from about 1% to about 75% by weight, preferably from about 55% to about 75% by weight, more preferably from about 59% to about 71% by weight; and a colorant in an amount of from about 0 to about 8% by weight, preferably from about 0.5% to about 8% by weight, more preferably from about 0.5% to 5% by weight.

In a preferred embodiment of the invention, an ink formulation comprises: water in an amount of from about 26% and 30% by weight, preferably from about 27% and 29% by weight; a crosslinkable, water-soluble poly (vinyl alcohol) in an amount of from about 1% to about 75% by weight, preferably from about 55% to about 75% by weight, more preferably from about 59% to about 71% by weight; and a colorant in an amount of from about 0 to about 8% by weight, preferably from about 0.5% to about 8% by weight, more preferably from about 0.5% to 5% by weight.

In another preferred embodiment of the invention, an ink formulation comprises water in an amount of from about 1% and 59% by weight, preferably from about 21% and 52% byweight, more preferably from about 28% and 45% by weight; a crosslinkable, water-soluble poly (vinyl alcohol) in an amount of from about 45% to about 75% by weight, preferably from about 47% to about 71% by weight; and a colorant in an amount of from about 0 to about 8% by weight, preferably from about 0.5% to about 8% by weight, more preferably from about 0.5% to 5% by weight.

In another preferred embodiment of the invention, an ink formulation comprises water in an amount of from about 1% and 59% by weight, preferably from about 21% and 52% by weight, more preferably from about 28% and 45% by weight; a crosslinkable, water-soluble poly (vinyl alcohol) in an amount of from about 1% to about 75% by weight, preferably from about 55% to about 75% by weight, more preferably from about 59% to about 71% by weight; and a colorant in an amount of from about 0.5 to about 5% by weight, preferably from about 1% to about 5% by weight, more preferably from about 4% to 5% by weight.

A more preferred formulation comprises water in an amount of from about 27% and 29% by weight, preferably about 28%; a crosslinkable, water-soluble poly (vinyl alcohol) in an amount of from about 70% to about 72% by weight, preferably about 71%; and a colorant in an amount of from about 0.5 to about 1.5% by weight, preferably about 1%.

Another more preferred formulation comprises water in an amount of from about 35% and 40% by weight, preferably from 36% to 37%; a crosslinkable, water-soluble poly (vinyl alcohol) in an amount of from about 58% to about 60% by weight, preferably about 59%; and a colorant in an amount of from about 4 to about 5% by weight, preferably about 4.5%.

The ink of the present invention also has good adhesion to a medical device, preferably an ophthalmic lens, more preferably a contact lens. As used herein, "good adhesion to a medical device" in reference to ink means that a color image transferred onto a medical device from the mold can pass at least a finger-rubbing test. It is preferred that such a printed medical device pass the finger rubbing test and a sterilization-surviving test.

The finger-rubbing test is performed by removing the hydrated contact lens from a packaging solution, e.g., saline, and digitally rubbing the lens between either two fingers or a finger and a palm for approximately 10 seconds. Visible and microscopic (~10×) observation of colorant bleeding, smearing, or delamination indicates failure of the rub test.

Production of medical devices including contact lenses always involve a step of sterilization, such as autoclave, or irradiation with UV light, x-ray, or the like. "Passing a sterilization-surviving test," means that no significant decoloring or delamination or the like can be observed after sterilization. For example, an autoclave-surviving test can be performed by removing a sterilized contact lens from a packaging solution, e.g., saline, and immersing it into a vial of methanol. The vial containing the hydrated contact lens and methanol is sonicated for 30 seconds using a standard laboratory sonicator. The lens is then removed from the methanol and placed back into the packaging solution. A finger-rubbing test is performed on this lens. Observation of bleeding, smearing, or delamination indicates failure of this test.

In a preferred embodiment, the ink of the present invention has a good transferability from a mold to a medical device. A "good transferability from a mold to a medical device" in reference to an ink means that a color image printed on a mold with the ink can be transferred completely onto a medical device cured in that mold.

In the preferred embodiment of the present invention, the ink is stable for at least four hours. More preferably, the ink is stable for at least eight hours. Even more preferably, the ink is stable for at least two days. Most preferably, the ink is stable for at least one week, or for at least three weeks. By "stable" with reference to ink, it is meant that no significant increase in viscosity occurs over a specific time period. Stable ink provides more flexibility in the mass production of colored ophthalmic lenses. The increase in viscosity (also referred to as gelling) is typically caused by crosslinking reactions between the components of the ink. Accordingly, the color coat is preferably substantially free of compounds, such as salts, that cause the poly(vinyl alcohol) to crosslink under normal conditions.

While any medical device can be printed using the inks of the present invention, the inks are especially useful for printing contact lenses. Lenses colored by this invention can be formed from any known polymerizable hydrophilic or hydrophobic material suitable for ophthalmic uses. Lens forming materials that are suitable in the fabrication of contact lenses are illustrated by numerous issued US patents and familiar to those skilled in the art. Preferred materials are hydrophilic and absorb substantial amounts of water to form hydrogels. While the selection of a lens material is largely determined upon the final modality of use of the final contact lens, the presently preferred lens material is nelfilcon. Nelfilcon contact lenses are available commercially from CIBA Vision of Duluth, Ga.

Producing the lens by polymerization, crosslinking, and/or shaping is well known in the art and is not presently considered a critical part of this invention. Any of the well-known techniques of cast molding and spin casting may be employed.

Methods for printing contact lenses are well known in the art. Typically, a color image can be printed first on a mold for making a contact lens and then a polymerizable or crosslinkable liquid mixture in the mold is cured to form a color contact lens onto which the color image is transferred from the mold. Such a method produces a colored contact lens with smooth surface that may provide more comfort to a wearer. The present invention is related more specifically to ink for pad printing of a color image on an ophthalmic lens, preferably a contact lens, or a mold for making a contact lens.

In pad-transfer printing, an image is placed or printed on a pad transfer device and the image on tile pad transfer device is transferred to another surface, such as a polymer or lens (U.S. Pat. Nos. 3,536,386 to Spivack; 4,582,402 and 4,704,017 to Knapp; 5,034,166 to Rawlings et al.). For example, appropriate pad-transfer printing structures include, but are not limited to Tampo-type printing structures (Tampo vario 90/130), rubber stamps, thimbles, doctor's blade, direct printing, or transfer printing as they are known in the art.

When the color coat is applied to the lens mold, rather than to the lens itself, the color coat is applied to a surface of the mold and the mold is then charged with the lens forming monomer while maintaining the color coat in the iris portion and configuring the resin about the color coat. The lens monomer is then polymerized using any of the well-known polymerization techniques. Alternatively, if the lens forming composition is a polymer (such as poly(vinyl) alcohol) the composition is then cross-linked according to well-known techniques. In this manner the color coat becomes integral with the body of the lens when the molded lens is removed from the mold. The resulting lens is essentially smooth and continuous on the surface containing the color coat.

If the lens is intended to be natural in appearance, the pattern applied to the lens preferably contains voids. Typically the voids comprise about 5 to about 80% of the pattern's area. On the other hand, it is preferred that the pattern occupy from 50% to all of the area of the lens in the iris region thereof (or that portion of the mold corresponding to the iris region of the lens). If the colorant is opaque, then only the portion of the lens corresponding to the iris is usually printed, leaving the pupil section clear. For lenses that are larger in diameter than the iris, the portion of the lens extending beyond the iris may be left unprinted.

While, either the front or rear surface or both may be printed, it is preferable to apply the ink to the front surface of the lens. However, there are special cosmetic effects achievable by providing a pattern on both the anterior and posterior surfaces. For instance, a colored pattern of one color can be applied to the back surface of the lens or the corresponding mold-half (for instance, white) and the same or different colored pattern can be applied to the front surface of the lens or the corresponding mold-half (for instance, dark blue). This then would result in a lens that could have either a multi-color textured appearance for extremely lifelike appearance, or a brighter tint using a white background to reflect back out at the observer.

If the ink is applied to both sides of a lens by printing up both sides of the mold, a pattern is affixed to both the back surface and the front surface molds as aforedescribed. Part of the lens-forming monomer mixture is supplied to each of the mold halves and each is partially polymerized thus fixing the patterns to the front and back surfaces of the lens. The two mold halves a recombined, and the combination is interpolymerized t o complete the cure and the formation of the lens with the patterns on both surfaces Preferably the ink contains an initiator. Suitable initiators include radical polymerization initiators and photo polymerization initiators. Of course, the initiator chosen will depend upon the type of curing carried out. Typical examples of radical initiators include azobisisobutyronitrile (AIBN), azobis-dimethylvaleronitrile, benzoyl peroxide, t-butyl hydroperoxide, and cumene peroxide. Such curing compositions include those available commercially from CIBA Specialty Chemicals under the "IRGACURE" and "DAROCUR" trade names and from DuPont under the "VAZO" tradename, such as VAZO 64 (AIBN), VAZO 67 (butane nitrile, 2-methyl, 2,2'-azobis) and VAZO 88 (cyclohexane carbonitrile, 1,1'-azobis).

Typical examples photo initiators include, a benzoin photo polymerization initiator such as methyl orthobenzoylbenzoate, methyl benzoylformate, benzoin methyl ether, benzoin ethyl ether, benzoin isopropyl ether, benzoin isobutyl ether or benzoin n-butyl ether; a phenone photo polymerization initiator such as 2-hydroxy-2-methyl-1-phenyl-propane-1-one, p-isopropyl-α-hydroxyisobutylphenone, p-t-butyltrichloroacetophenone, 2,2-dimethoxy-2-phenylacetophenone, α,α-dichloro-4-phenoxyaceto-phenone or N,N-tetraethyl-4,4-diaminobenzophenone; 1-hydroxycyclohexyl phenyl ketone; 1-phenyl-1,2-propanedione-2-(o-ethoxycarbonyl)oxime; a thioxanthone photo polymerization initiator such as 2-chlorothioxanthone or 2-methylthioxanthone; dibenzosvarron; 2-ethylanthraquinone; benzophenone acrylate; benzophenone; and benzil.

The identity of the initiator is not critical and is not part of the present invention. One of ordinary skill in the art will readily recognize the kind and amount of photoinitiator that will yield good results in the present invention. The initiator presently preferred by the inventors is DAROCUR 1173, a photo-initiator.

The inks of the invention can optionally (but preferably do not) include a cross linker. A "cross linker" refers to a compound comprising two or more functional groups, as they are known in the art. A cross linker molecule can be used to crosslink two or more monomers or polymer molecules. Cross linkers are known in the art and are disclosed in various US Patents. Such crosslinkers may be added to the ink in order to match the physical properties (e.g. modulus) of the cured ink to that of the cured lens to which it is applied.

The inks of the invention can optionally (but preferably do not) include a surfactant. The term "surfactant," as used herein, refers to a surface-active compound as that term is known in the art, such as, for example, Surfynol 420 and Surfynol 104 (from Air Products), Pluronic F108 and F38 (from BASF). A surfactant can have one ore more of the following functions: to adjust the surface tension of an ink, to defoam, to improve the separation of pigment particles, and to prevent settling or clumping of pigment particles.

The inks of the invention can optionally (but preferably do not) include an antimicrobial compound. Some suitable antimicrobial materials include polyquaternary ammonium compounds, such as those described in U.S. Pat. No. 3,931,319 to Green et al. (e.g. "POLYQUAT"), which is incorporated herein by reference. Other antimicrobial or antibacterials that can be utilized in the present invention are peptides, other polyquats, mucin, mucin mimics, glycopeptides, glycoproteins, silk proteins, cellulose, dextran or other anti-microbial or anti-bacterial entities.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

This example illustrates how to prepare a master batch of the ink of the present invention.

A master batch of blue ink was prepared by grinding 32.08 g (11.8% by weight) phthalocyanine blue (PCN) (pigment), 171.78 g (63.0%) nelfilcon (acrylated-poly(vinyl alcohol) and 69.00 (25.3%) water with an attritor grinding system. The attritor grinding system is developed using a solid Teflon single milling impeller (EMS T60, BYK Gardner) connected to ⅜" stainless steel shaft. The shaft is driven by an Arrow 6000 ¹⁄₁₀ hp direct drive mixer. Approximately 200 ml Zirconia beads (1.6-2.5 mm diameter, BYK Gardner) are placed in a 500 ml stainless steel water-jacketed container (500 ml capacity, BYK Gardner) along with the Teflon impeller head. The nelfilcon prepolymer was added, followed by the PCN blue. The impeller speed was set to 1200-1000 rpm and allowed to grind over a 64-hour period. The beads were removed by pouring the resulting liquid through a mesh. The master batch was stored in a plastic vessel at room temperature until needed. The master batch remained a liquid throughout the experiments.

Particle size analysis is carried out using the Horiba LA-920 particle analyzer on a Windows platform. The refractive ratio index used was 1.04 for PCN blue/water, and an imaginary term of 10 was included (104A010l).

The nelfilcon/water media provided a good suspension agent for the PCN blue. The PCN blue remained suspended for many weeks. The master batch did show foam incorporation after attrition, and required about a day for defoaming.

The attritor did show a reduction in the particle size; the average particle size was reduced from 1.8 to 0.3 mm after the attritor step. About 98% of the particles are smaller than 1 mm; the other 2% should be filterable. An ultrasonication ladder of the inks did not show a reduction in the particle size, providing evidence of the suspension stability. The ink prepared in nelfilcon/water media shows foaming, but defoaming occurs after standing for 24 hours. If desired, foaming can be reduced by addition of a small amount of surfactant, such as Surfynol 420, IPA, or ethyl lactate.

EXAMPLE 2

Fourteen water-based cyan pad-printing inks (2A-2N) were prepared from the master batch of PCN ink as prepared in Example 1 (11.8% PCN blue, 63.0% nelfilcon and 25.3% water). Each cyan pad-printing ink is prepared by dilution the maser batch of PCN ink with water and nelfilcon, with compensation for the added nelfilcon and water in the PCN master batch.

Viscosity measurements are performed using the Brookfield LVTDV-II at 25° C., 60 rpm with a spindle 16. The results are put forth in Table 1.

TABLE 1

| Sample | Nelfilcon (wt %) | PCN (wt %) | Water (wt %) | Viscosity (cps) | Ln(viscosity) |
|---|---|---|---|---|---|
| 2A | 71.0 | 1.0 | 28.0 | 344 | 5.84 |
| 2B | 71.0 | 1.0 | 28.0 | 336 | 5.82 |
| 2C | 53.0 | 2.8 | 44.3 | 126 | 4.84 |
| 2D | 47.0 | 1.0 | 52.0 | 60.1 | 4.10 |
| 2E | 59.0 | 1.0 | 40.0 | 138 | 4.93 |
| 2F | 47.0 | 1.0 | 52.0 | 62.1 | 4.13 |
| 2G | 59.0 | 8.0 | 33.0 | 715 | 6.57 |
| 2H | 71.0 | 8.0 | 21.0 | N/A | |
| 2I | 47.0 | 8.0 | 45.0 | 302 | 5.71 |
| 2J | 59.0 | 4.5 | 36.5 | 306 | 5.72 |
| 2K | 71.0 | 8.0 | 21.0 | N/A | |
| 2L | 65.0 | 6.3 | 28.8 | 708 | 6.56 |
| 2M | 47.0 | 4.5 | 48.5 | 116 | 4.75 |
| 2N | 47.0 | 8.0 | 45.0 | 287 | 5.66 |

Those samples indicated "N/A" were not measured for viscosity, since they were known to be of very high viscosity by way of visual inspection.

EXAMPLE 3

Examples 2A, 2B, 2I, 2J, and 2N were applied to contact lenses using standard pad-printing techniques on a manual printer. Specifically, the ink was applied by drawing drops of ink across a typical cliché pattern. The pattern was lifted out of the cliché with a silicon pad and transferred to the male side of a polypropylene contact lens mold.

The female mold was filled with 100 µl nelfilcon using an Eppindorf multipipettor. The male mold was press fit over the female and compressed to ~24 psi. The lenses were cured with either a handheld UV source (Spectroline model EMF-260, 365 nm button) for 300 sec at ~0.5 cm or with Dr. Gröbel's light source (UV-LQ 400/C, a high-pressure mercury arc lamp, available from Dr. Gröbel UV-Elektronik GmbH) for 7 seconds at ~0.5 cm. For Dr. Gröbel's light source, a condenser and a 305 nm cut-off filter is placed in front of the light source. A chart of the measured light intensities at different wavelengths is shown in Table 2.

Intensities were measured at 280 nm with a UVPS IL400 A radiometer (range 245-320 nm), 300 nm with a calibrated UVX-31 (UVP, Upland Calif., range 260-360 nm), 365 nm with a UVX-36 (UVP, Upland Calif., range 300-400 nm). Dr. Gröbel's values were multiplied by 0.1 from the displayed numbers to compensate for the detector amplification. Dr. Gröbel's lamp was measured after a condenser and 305 nm cut-off filter.

TABLE 2

| Lamp | 280 nm | 300 nm | 365 nm | Dr. Gröbel's detector |
|---|---|---|---|---|
| Gröbel's lamp, 0.5 cm | >2 mW/cm² | >20 mW/cm² | >20 mW/cm² | 1.195 mW/cm² |
| Spectroline lamp, 1 cm | >2 mW/cm² | 4.13 mW/cm² | 1.49 mW/cm² | 0.25 mW/cm² |

After curing, the molds were opened and the lenses were placed in a hydration solution for approximately 30 seconds. The lenses were pealed off the male side and stored in a packaging solution. Autoclaving was done using a tabletop heat sterilizer (typical cycle time 130° C. for 45 minutes).

Initial rub tests are done by removing the hydrated lens from the packaging solution and digitally rubbing the lens between either two fingers or a finger and a palm for approximately 10 seconds. Visible and microscopic (~10×) observation of colorant bleeding, smearing, or delamination indicates failure of the rub test.

Subsequent rub tests are done by removing the hydrated lens from the packaging solution and insertion into a vial of methanol. The vial is sonicated for 30 seconds using a standard laboratory sonicator. The lens is removed from the methanol and placed back into the packaging solution. A rub test is performed. Observation of delamination indicates failure of this test.

Those inks having 8% PCN blue levels and the lowest nelfilcon concentration (Examples 2I and 2N) showed poor adhesion. However, all other examples adhered to the cured contact lens, after hydration, packaging, autoclaving, and a vigorous digital rubbing procedure. It is suspected that the polymer density of 2I and 2N was too low to hold the high PCN levels.

EXAMPLE 4

A master batch of the magenta ink is prepared by grinding 34.8 g (12%) Red 122 (Fastogen Super Magenta) obtained from Sun Chemical, 26.1 g (9%) nelfilcon, and 229.1 g (79%) water for about 24 hours with the attritor grinding system described in Example 1. Red 122 is added first, followed by the nelfilcon and water. The master batch is stored in a Nalgene bottle at room temperature until needed. The master batch remained a liquid throughout the experiments.

The particle size analysis of the original sample shows a large distribution of the particles between 0.2 and 20 µm. Only after few hours of grinding more than 96% of the particles are less than 0.6 µm. Ultrasonication of the ink does not result in any noticeable reduction in particle size, indicating that the suspension is relatively stable. The Red 122 remains suspended for many weeks. Foaming occurs in the master batch after the grinding step but disappear in a few hours by standing.

The master batch formulation (12% Red 122, 9% nelfilcon, 79% water) has a viscosity of 43.8 cps. Inks are prepared from this master batch by adding nelfilcon to result in a viscosity greater than 50 cps. Alternatively, the master batch can be made with greater nelfilcon than in this example.

EXAMPLE 5

A master batch of the yellow ink is prepared by grinding 34.8 g (12%) Yellow 154 (Symuler Fast yellow 4192) from Sun Chemical, 26.1 g (9%) nelfilcon and 229.1 g (79%) water for about 24 hours with the attritor grinding system described in Example 1. Yellow 154 is added first, followed by nelfilcon and water. The master batch is stored in a Nalgene bottle at room temperature until needed. The master batch remains a liquid throughout the experiments.

The particle sizes of the original sample are distributed between 0.5 and 100 µm. After ultrasonication of the sample, the particles size is determined to be within a narrower distribution range with 70% of the particles less than 1 µm. After 3 hours of grinding more than 96% of the particles was less than 1 µm. Ultrasonication of the master batch ink does not result in a reduction in particle size, indicating that the suspension is stable. Yellow 154 particles remain suspended for many weeks. Foaming occurs in the master batch after the grinding step, but the foam disappears in a few hours by standing.

The master batch formulation (12% Yellow 154, 9% nelfilcon, 79% water) has a viscosity of 33.4 cps. Inks are prepared from this master batch by adding nelfilcon to result in a viscosity greater than 50 cps. Alternatively, the master batch can be made with greater nelfilcon than in this example.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims. Furthermore, any headings of various portions of the description of the preferred embodiment are for convenience only and are not meant to limit the scope of the invention in any way.

What is claimed is:

1. An ink for pad printing a medical device comprising: from about 1% and 59% by weight of water; from about 0.5% to about 8% by weight of a colorant; and from about 1% to about 75% by weight of a binder polymer, wherein the binder polymer is a crosslinkable, water-soluble poly(vinyl alcohol) having olefinically unsaturated radicals, provided that the ink does not include a crosslinker to crosslink two or more monomers or polymer molecules, wherein the ink has a viscosity of greater than 100 centipoise, wherein the ink without crosslinker has good adhesion to a medical device, wherein the water-soluble poly(vinyl alcohol) is a crosslinkable polymer based on a polyhydroxyl compound which is a derivative of a poly(vinyl alcohol) having a molecular weight of at least about 2000 which comprises from about 0.5 to about 80%, based on the number of hydroxyl groups in the poly(vinyl alcohol), of units of the formula I, I and II, I and III, or I and II and III

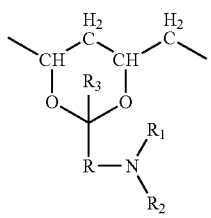

I in which R is alkylene having up to 12 carbon atoms, $R_1$ is hydrogen or lower alkyl, $R_2$ is an olefinically unsaturated, electron-withdrawing, crosslinkable radical, preferably having up to 25 carbon atoms, and $R_3$ is hydrogen, a $C_1$-$C_6$ alkyl group or a cycloalkyl group,

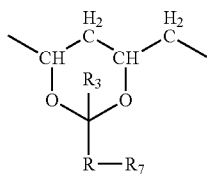

II wherein R and $R_3$ are as defined for formula I above, and $R_7$ is a primary, secondary or tertiary amino group or a quaternary amino group of the formula $N^+(R')_3 X^-$, in which each R', independently of the others, is hydrogen or a $C_1$-$C_4$ alkyl radical and X is a counter ion,

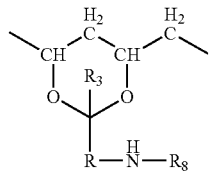

III in which R and $R_3$ are as defined for formula I above, and $R_8$ is the radical of a monobasic, dibasic or tribasic, saturated or unsaturated, aliphatic or aromatic organic acid or sulfonic acid.

2. An ink of claim 1, wherein a color image printed on a medical device with said ink, passes an autoclave-surviving test.

3. An ink of claim 1, wherein the viscosity is from 100 to about 1000 cps.

4. An ink of claim 3, wherein the viscosity is between 250 and 350 cps.

5. An ink of claim 1, wherein the colorant is selected from the group consisting of a pigment and a dye which is either sparingly soluble or insoluble in water.

6. An ink of claim 5, comprising water in an amount of from about 26% and 30% by weight.

7. An ink of claim 5, comprising water-soluble poly (vinyl alcohol) in an amount of from about 47% o about 71% by weight.

8. An ink of claim 5, comprising colorant in an amount of from about 1% to 5% by weight.

9. An ink of claim 5, wherein said colorant comprises a pigment selected from the group consisting of phthalocyanine blue, cobalt blue, phthalocyanine green, chromium sesquioxide; iron oxide pigments, and carbazole violet.

10. An ink of claim 9, wherein said colorant comprises phthalocyanine blue.

11. An ink of claim 10, comprising water in an amount of from about 27% and 29% by weight by weight; crosslinkable water-soluble poly (vinyl alcohol) in an amount of from about 70% to about 72% by weight; and phthalocyanine blue in an amount from about 0.5 to about 1.5% by weight.

12. An ink of claim 10, comprising water in an amount of from about 36% to 37% by weight by weight; crosslinkable water-soluble poly (vinyl alcohol) in an amount of from about 58% to about 60% by weight; and phthalocyanine blue in an amount from about 4% to about 5% by weight.

13. An ink of claim 1, wherein the medical device is an ophthalmic lens.

14. An ink of claim 13, wherein the ophthalmic lens is a contact lens.

15. An ink of claim 1, wherein said poly (vinyl alcohol) comprises multiple crosslinkable groups; and the multiple crosslinkable groups are capable of forming inter- and intra crosslinkages with other crosslinkable groups of the same type or different type so that a macromolecular matrix can be formed to bind or trap pigments when cured.

16. An ink of claim 1, wherein $R_2$ is a radical of the formula V

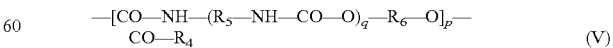

(V)

in which p and q, independently of one another, are zero or one, and $R_5$ and $R_6$, independently of one another, are lower alkylene having 2 to 8 carbon atoms, arylene having 6 to 12 carbon atoms, a saturated bivalent cycloaliphatic group having 6 to 10 carbon atoms, arylenealkylene or alkylenearylene having 7 to 14 carbon atoms or arylenealkylenearylene having 13 to 16 carbon atoms, and in which $R_4$ is an olefinically unsaturated copolymerizable radical having 2 to 24 carbon atoms.

17. An ink of claim 16, wherein $R_4$ is an olefinically unsaturated copolymerizable radical having 2 to 8 carbon atoms.

18. An ink of claim 1, wherein the ink has a good transferability from a mold for making the contact lens to the contact lens.

19. An ink of claim 1, wherein the ink is stable for at least 4 hours.

20. An ink of claim 19, wherein the ink is stable for at least 24 hours.

21. An ink of claim 20, wherein the ink is stable for at least three weeks.

22. An ink of claim 21, wherein said crosslinkable poly(vinyl alcohol) is crosslinked by exposure to UV radiation.

23. A method for making a colored contact lens comprising the steps of:

(a) coating at least a portion of at least one lens-forming surface of a lens mold with a water-based ink comprising water; a colorant; and a binder polymer which is a crosslinkable, water-soluble poly(vinyl alcohol) having olefinically unsaturated radicals, provided that the ink does not include a cross linker to crosslink two or more monomers or polymer molecules, wherein the ink has a viscosity of greater than 100 centipoise, wherein the ink without crosslinker has good adhesion to a medical device, wherein the water-soluble poly(vinyl alcohol) is a crosslinkable polymer based on a polyhydroxyl compound which is a derivative of a poly(vinyl alcohol) having a molecular weight of at least about 2000 which comprises from about 0.5 to about 80%, based on the number of hydroxyl groups in the poly(vinyl alcohol), of units of the formula I, I and II, I and III, or I and II and III

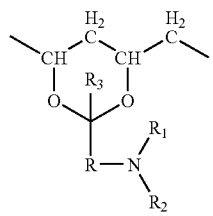

I in which R is alkylene having up to 12 carbon atoms, $R_1$ is hydrogen or lower alkyl, $R_2$ is an olefinically unsaturated, electron-withdrawing, crosslinkable radical, preferably having up to 25 carbon atoms, and $R_3$ is hydrogen, a $C_1$-$C_6$ alkyl group or a cycloalkyl group,

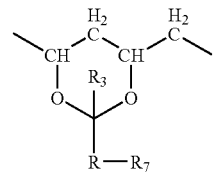

II wherein R and $R_3$ are as defined for formula I above, and $R_7$ is a primary, secondary or tertiary amino group or a quaternary amino group of the formula $N^+(R')_3X^-$, in which each R', independently of the others, is hydrogen or a $C_1$-$C_4$ alkyl radical and X is a counter ion,

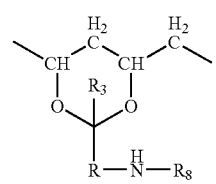

III in which R and $R_3$ are as defined for formula I above, and $R_8$ is the radical of a monobasic, dibasic or tribasic, saturated or unsaturated, aliphatic or aromatic organic acid or sulfonic acid;

(b) adding a lens forming composition to the lens mold while maintaining the color coat in position; and (c) curing the lens-forming composition to form a coated lens;

wherein said contact lens is characterized by having no visible observation of colorant bleeding, smearing, or delamination after digitally rubbing said contact lens between either two fingers or a finger and a palm for approximately 10 seconds.

* * * * *